United States Patent [19]

Lampeter et al.

[11] Patent Number: 5,174,718

[45] Date of Patent: Dec. 29, 1992

[54] BLADE PITCH CHANGE CONTROL SYSTEM

[75] Inventors: Robert J. Lampeter, Windsor; Jerome G. Duchesneau, Andover, both of Conn.

[73] Assignee: United Technologies Corporation, Hartford, Conn.

[21] Appl. No.: 743,943

[22] Filed: Aug. 12, 1991

[51] Int. Cl.⁵ .............................. B64C 11/40
[52] U.S. Cl. ...................... 416/48; 416/157 R
[58] Field of Search ............ 416/31, 44, 47, 48, 416/157 R

[56] References Cited

U.S. PATENT DOCUMENTS

| | | |
|---|---|---|
| 2,840,170 | 6/1955 | Best . |
| 2,840,171 | 10/1955 | Jedrziewski et al. . |
| 2,865,460 | 6/1956 | St. John, Jr. . |
| 3,112,901 | 12/1963 | Kohman .......... 416/47 |
| 4,588,354 | 5/1986 | Duchesneau et al. . |
| 5,037,271 | 8/1991 | Duchesneau et al. . |
| 5,042,966 | 8/1991 | Schwartz et al. . |

FOREIGN PATENT DOCUMENTS 0311277 12/1989 European Pat. Off. .
0409552 1/1991 European Pat. Off. .

OTHER PUBLICATIONS

Scoles, Richard J., "FADEC-Every Jet Engine Should Have One", SAE Technical Paper 861802.

Primary Examiner—Edward K. Look
Assistant Examiner—James A. Larson
Attorney, Agent, or Firm—William W. Habelt

[57] ABSTRACT

A pitch change actuation system is disclosed for adjusting the pitch of a variable pitch propeller blades (120) operatively connected for pitch change to a pitch change actuator piston (140). A pitch change control system (10) is operatively connected to the pitch change actuator piston (140) for selectively pressuring the pitch change actuator piston to effectuate a desired change in the pitch of the propeller blades (120). The pitch change control system (10) comprises a primary electrohydraulic valve (30), a protection valve (60), an electronic controller (20) and a protection solenoid (50). During normal operation, the primary electrohydraulic valve (30) is modulated under control of the electronic controller (20) to effect pitch change. In the event of failure of the electronic controller (20), the protection solenoid (50) is operative to activate the protection valve (60) to assume pitch change authority over the primary electrohydraulic valve (30) thereby providing emergency feathering capability, overspeed protection, low pitch stop limit protection, and in place pitchlock despite failure of the electronic controller.

5 Claims, 2 Drawing Sheets fig.2

5,174,718

BLADE PITCH CHANGE CONTROL SYSTEM

TECHNICAL FIELD

This invention relates to aircraft propeller systems of the variable pitch type in general and, more particularly, to a system for controlling the adjustment of the pitch of the blades of a variable pitch propeller.

BACKGROUND ART

Variable pitch propeller systems typically incorporate a plurality of propeller blades mounted to a rotary hub driven by the aircraft's engine, with each propeller blade extending radially outwardly from the hub along the longitudinal axis of the blade. In order to permit pitch adjustment, each blade is mounted to the hub for pivotable movement about its longitudinal axis. The hub typically encloses a chamber within its interior wherein a pitch change actuation system is disposed which is operatively connected to the propeller blades. The actuation system functions to selectively change the pitch of the blades, therefore altering air resistance to the rotation of the blades to thereby control engine speed.

In most modern aircraft, the pitch change actuator is of the hydromechanical type wherein an output member, conventionally a hydraulic piston, is driven in response to blade loading and the pressure forces exerted by the hydraulic pitch change fluids exerted upon the opposite faces of the piston. Such hydromechanical pitch change actuation systems are well known in the art. For example, commonly assigned U.S. Pat. No. 4,523,891 to Schwartz and Duchesneau discloses a conventional pitch actuation system wherein each propeller blade is operatively connected to a piston which is driven by the pressure of a fluid which is selectively directed in response to a departure from desired engine speed against the opposite faces of the piston thereby causing a linear displacement of the piston and a resultant change in pitch of the blades operatively connected to the piston.

When the blade loading, which varies with blade pitch setting and other factors, is in balance with the net pressure force exerted by the pitch change fluids acting in opposition on the pitch change actuator piston, the blades remain at a their current pitch setting. If there exists a difference between the net pressure force exerted on the piston relative to the blade loading, the blades will be driven to a new pitch setting unless the net pressure force exerted on the actuator piston is adjusted to eliminate the imbalance relative to blade loading by increasing or decreasing as appropriate the pressure of the coarse pitch fluid and/or fine pitch fluid to maintain the actuator at a desired position, and thus the blades at the desired pitch setting, to maintain the desired engine speed. If it is desired to move the blades to a new pitch setting, for example so as to maintain a desired engine speed despite a change in blade loading due to other factors, the pressure of the coarse pitch fluid and/or that of the fine pitch fluid is selectively changed to appropriately adjust the net pressure force exerted upon the actuator piston relative to the blade loading so as to drive the blades to the desired new pitch setting.

The adjustments in fluid pressure are typically controlled by either a hydromechanical or electronic control system which monitors engine speed and selectively ports, by way of collateral apparatus, coarse and/or fine pitch change fluid at the proper fluid pressure to act upon the pitch change actuator piston whenever monitored engine speed departs from the desired engine speed setting. As a malfunction of the control system could result in an engine overspeed condition, a backup controller is typically provided in conventional blade pitch control systems to assume blade pitch control should a malfunction occur in the main pitch controller. For example, a pitch change control system having a main hydromechanical engine speed governor and a backup hydromechanical engine speed governor is disclosed in commonly assigned U.S. Pat. No. 4,588,354. As disclosed therein, a least selector valve is provided which continuously compares the pressure of the pitch change fluid supplied through the main governor with the pressure of the pitch change fluid supplied through the backup governor. The least selector valve passes the lowest magnitude pressure signal to a piston actuator which sets the blade pitch in accordance with the magnitude of the passes pressure signal, whereby the governor providing the lowest pressure signal controls blade pitch independently of the other governor.

Blade pitch control systems having a constant speed controller, an overspeed controller, a computer for controlling operation of at least the constant speed controller, and preferably also the overspeed controller are also known in the art. For example, in European Patent Application Publication 0 311 277, there is disclosed a pitch control system having two electrohydraulic servo-valve controllers, one for controlling constant speed operation and the other for controlling overspeed operation, a microprocessor for controlling each of the electrohydraulic servo-valves, and a feathering valve for overriding the constant speed servo-valve by supplying high pressure fluid to the pitch actuator to drive the blades to feather in the event of a failure of the constant speed servo-valve preventing feathering of the blades.

DISCLOSURE OF INVENTION

It is an object of the present invention to provide an electronic blade pitch controller for use in conjunction with a hydraulic or hydromechanical pitch change actuator for controlling the supply of pitch change fluid to the actuator to govern blade pitch control over the entire propeller blade pitch envelope.

It is a further object of the present invention to provide such an electronic blade pitch controller having a primary electrohydraulic valve and a protection electrohydraulic valve operative to assume control authority over the primary electrohydraulic valve for feathering and for providing low pitch stop and overspeed protection.

It is also an object of the present invention to provide an electronic blade pitch controller for governing blade pitch control over the entire propeller blade pitch envelope having means for limiting the rate at which the propellers may be moved during a decrease pitch change so as to preclude overshoot to an engine overspeed condition.

The blade pitch control system of the present invention comprises a primary electrohydraulic valve controlled by an electronic controller to govern blade pitch maintainable and change over the entire blade pitch envelope during normal operation, including both during cruise and during ground operation; a protection electrohydraulic valve for taking control from the primary electrohydraulic valve for providing feathering, low pitch stop and overspeed protection in the event of a malfunction of the electronic controller; a protection solenoid for selectively transferring authority to the protection electrohydraulic valve for emergency blade feathering and for modulating blade pitch at the low pitch stop limit and within the overspeed limit during an overspeed condition. Advantageously, the blade pitch control system of the present invention may also include a rate limiter for regulating the rate at which the blades may be driven to a finer pitch, i.e. during a pitch change to decrease blade pitch, so as to preclude overshoot to a lower than desired pitch and a possible resulting engine overspeed condition.

During normal operation of the blade pitch control system of the present invention, blade pitch control over the entire operating envelope of blade pitch, both in flight and on the ground, is controlled by an electronic controller selectively adjusting the primary electrohydraulic valve to modulate the pressure of the coarse pitch fluid, i.e. the pitch change fluid supplied to the coarse pitch side of the actuator piston of the pitch change actuator, to maintain or change blade pitch, as desired. Feedback is provided to the electronic controller through the primary electrohydraulic valve and a feedback device, for example a linear variable differential transformer (LVDT). In the event of a malfunction of the electronic controller, such as might result in the event of an electrical power failure, the protection solenoid transfers control to the protection electrohydraulic valve which thence assumes authority over the primary electrohydraulic valve to either feather the blades or modulate blade pitch within the low pitch limit or the overspeed limit, as the case may be. Thus, the protection electrohydraulic valve functions to provide redundant feathering, low pitch and overspeed protection to ensure safe operation in the event of a malfunction of the electronic controller.

BRIEF DESCRIPTION OF DRAWING

The aforementioned objects, as well as other objects, features and advantages of the present invention will become more apparent in light of the detailed description thereof illustrated in the accompanying drawing, wherein:

FIG. 2 is a partially sectioned, schematic view of the blade pitch control system of the present invention as illustrated in FIG. 1.

BEST MODE FOR CARRYING OUT THE INVENTION

Figure 1:
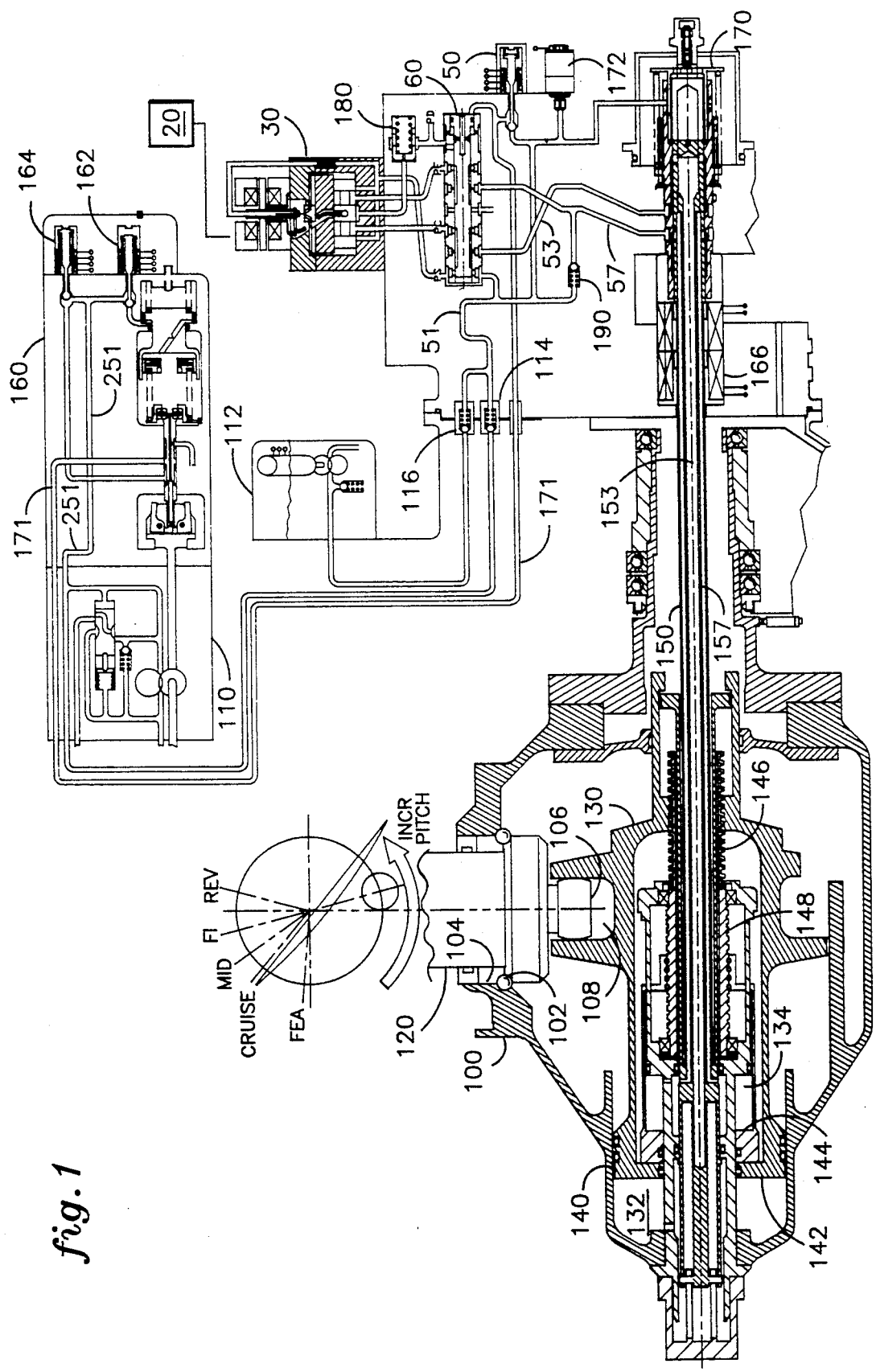
FIG. 1 is a partially sectioned, schematic view of a pitch change system incorporating the pitch blade control system of the present invention.

The present invention is directed to an electronic blade pitch control system for regulating the pitch of the blades of a variable pitch propeller system of the type suitable for use on propeller driven aircraft. As depicted in the FIG. 1, the propeller system includes a hub 100 into which a plurality of propeller blades 120, of which only one is shown, are mounted. Each blade is mounted at its root end on bearings 102 in an socket 104 in the disc end of the hub 100 so as to be pivotally adjustable for pitch change about its longitudinal axis.

An eccentric roller 106 extends outwardly from the lower end of the root portion of the blade 120 and is received within a cam slot 108 of a desired shape provided in a hydraulically actuated blade pitch change actuator 130 having an axially translatable actuation piston 140 comprising a coarse pitch piston 142 threadably mounted to a pitchlock screw 146 and a fine pitch piston 144 mounted on a ballscrew 148. In this manner, the blades 120 are operatively connected to the pitch change actuator 130 such that an axial translation of actuator piston 140 in one direction, in this case rearwardly (i.e. left to right in FIG. 1), accomplishes a change to a coarser, i.e. higher blade pitch and in the other direction, in this case forwardly, accomplishes a change to a finer, i.e. lower, blade pitch.

During normal operation, to effect a pitch change or maintain a desired pitch setting despite changing blade load, the axially translatable actuation piston 140 of the pitch change actuator 130 is selectively pressurized with a fluid such as hydraulic oil pumped from a fluid reservoir (not shown) via a main pump 110, or in the event of a malfunction of the main pump 110 via an auxiliary pump 112 as in conventional practice, through the primary electrohydraulic valve 30, herein also referred to as the primary EHV 30, under control of the electronic controller 20, thence through the protection electrohydraulic valve 60, herein also referred to as the protection EHV 60, to and through a transfer tube 150 to be applied against the appropriate face of the actuator piston 140. A pair of check valves 114 and 116 may be provided to prevent reverse flow from the supply conduit 51 through the main or auxiliary pumps in the event of loss of pressure at at either pump. In normal operation, the protection EHV 60 functions solely as a conduit through which the pitch change fluid passes and does not in anyway interfere with the authority of the primary EHV 30. The axial position of the actuator piston, which indicates the actual blade pitch, is continuously sensed and fed back to the electronic controller by position feedback means, such as a linear variable differential transformer (LVDT) 166 operatively associated with the transfer tube 150.

The axial position of the actuator piston 140, and therefore the pitch of the blades 120, is maintained at equilibrium at any desired pitch setting by balancing the net pressure force on the actuator piston 140 with the blade loading transmitted to the pitch change actuator 130, the net pressure force being the difference between the pressure force exerted by the coarse pitch change fluid supplied to the coarse pitch fluid chamber 132 and acting upon the face of the coarse pitch piston 142 of the actuator piston 140 and the counter acting pressure force exerted by the fine pitch change fluid supplied to the fine pitch change fluid chamber 134 and acting upon the face of the fine pitch piston 144 of the actuator piston 140. The effective area of the face of the coarse pitch piston 142 is advantageously substantially greater than, for example approximately twice, the effective area of the face 144 of the fine pitch piston 144. Thus, by adjusting the pressure of the coarse pitch fluid, the net pressure force on the actuator piston 140 may be readily balanced against any change in the blade loading force on the actuator piston, which acts to drive the blades 120 to a finer pitch setting, thereby counteracting movement under the influence of an increase in blade loading to a finer pitch, thereby maintaining the blades at a desired pitch setting. Additionally, the magnitude of the net pressure can be readily varied by modulating the pressure of the coarse pitch fluid relative to the fine pitch fluid to increase or decrease the magnitude of the rearwardly acting net pressure force relative to the blade loading force so as to effect a desired translation of the coarse pitch piston 142 and the fine pitch piston 144, together as a unit in back to back relation during normal operation, rearwardly or forwardly, so as to drive the blades 120 to a different pitch setting.

The primary EHV 30 is controlled by the electronic controller 20 to modulate the pressure Pc of the coarse pitch fluid between a lower drain pressure, i.e. the pressure of a supply fluid reservoir (not shown), and a higher supply pressure, i.e. the pressure at which the fluid is received from the pump, while maintaining the pressure Pf of the fine pitch fluid at the higher supply pressure. To effect a pitch change to a coarser pitch setting, the electronic controller 20 modulates the primary EHV 30 to increase the pressure of the coarse pitch fluid and passes the coarse pitch change fluid from supply through a first pitch change fluid conduit 153 in an axially elongated transfer tube 150 to the coarse pitch fluid chamber 132 thereby increasing the pressure acting on the face of the coarse pitch piston 142 such that the net pressure force acting on the piston 140 exceeds the blade loading, thus resulting in the actuator 130 being translated rearwardly to drive the blades 120 to a new coarser pitch. To effect a pitch change to a finer pitch setting, the electronic controller 20 modulates the primary EHV 30 to decrease the pressure of the coarse pitch fluid, while passing fine pitch change fluid at supply pressure through a second pitch fluid conduit 157 in the axially elongated transfer tube 150 to the fine pitch fluid chamber 134 thereby decreasing the pressure acting on the face of the fine pitch piston 144 such that the net pressure force acting on the piston 140 is now exceeded by the blade loading, thus resulting in the actuator 130 being translated forwardly as the blades 120 are driven under the blade loading to a new finer pitch setting and the coarse pitch change fluid drains back to the fluid reservoir.

Figure 2:
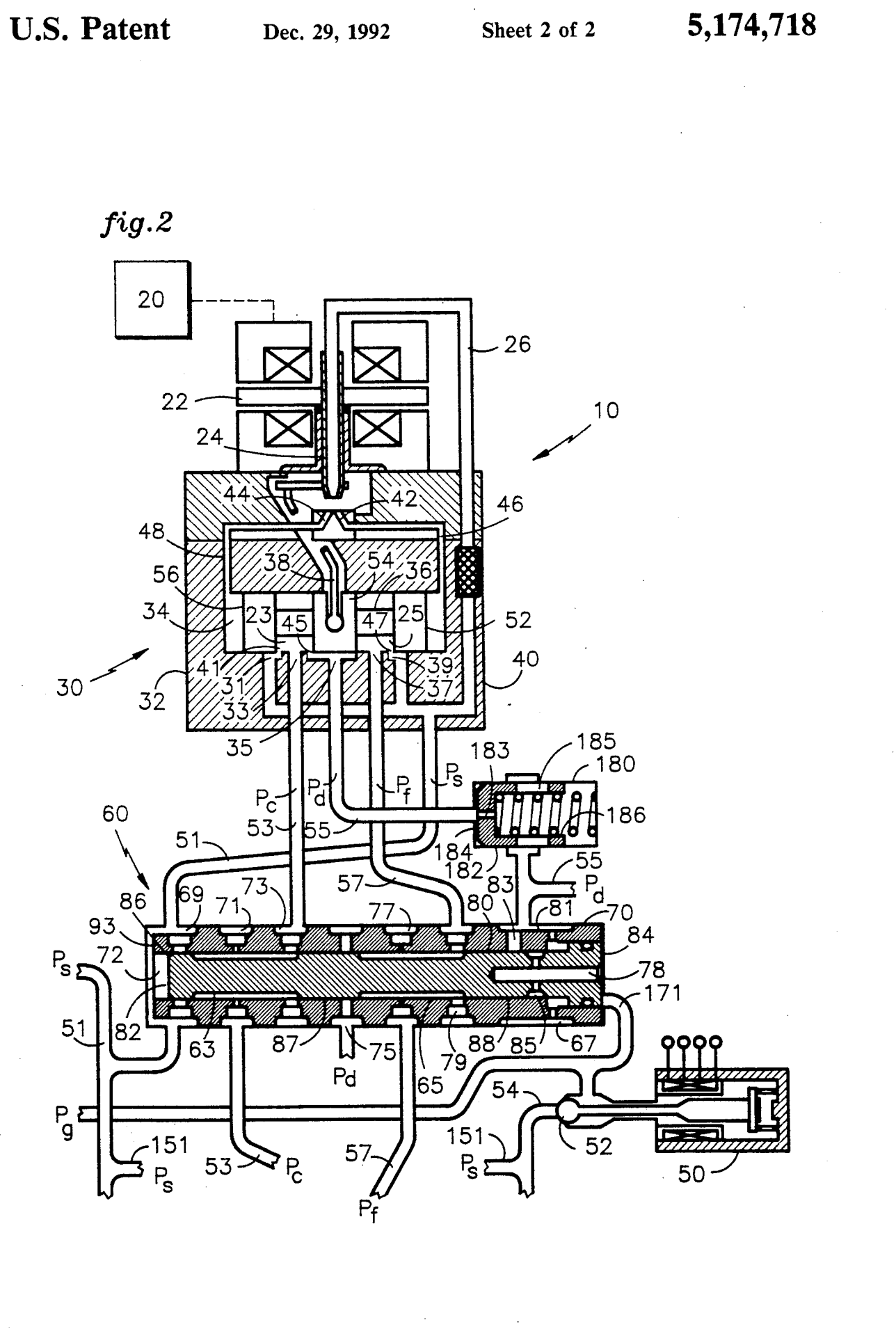

Referring now to FIG. 2, the blade pitch control system 10 of the present invention comprises the primary EHV 30 controlled by the electronic controller 20, the protection EHV 60, and a protection solenoid 50 for transferring authority to the protection EHV 60 away from the primary EHV 30 in the event of a malfunction of the electronic controller 20. Advantageously, the blade pitch control system 10 of the present invention also includes a rate limiter 180 operatively disposed relative to the primary EHV 30 and the protection EHV 60 for limiting the rate at which the piston actuator 140 may be actuated to drive the blades 120 to fine pitch.

Except in the event of a failure, normal pitch change logic and scheduling is provided by the electronic controller 20 over the entire blade pitch envelope including in flight pitch control, ground pitch control including low pitch stop override and blade reversal, and emergency feathering. The electronic controller 20 comprises a microprocessor programmed with all the pitch change logic necessary to control and schedule blade pitch over the entire operating range. On multi-engine aircraft, the electronic controller 20 may also be programmed to synchrophase the propellers in a conventional manner by biasing blade pitch between the propeller shipsets. Advantageously, the electronic controller comprises a full authority digital electronic controller (FADEC), a type of electronic controller that has been used for some time as an electronic engine controller on aircraft turbine engines to automatically operate and modulate hydromechanical fuel flow controllers and is not per se new in the art. Such full authority controllers are provided with redundant control channels and redundant inputs and outputs to provide added safety.

The primary EHV 30, which in the depicted embodiment of the present invention depicted comprises a conventional jet pipe EHV of the type well known in the art, is operatively connected to a torque motor 22 controlled by the electronic controller 20. The primary EHV 30 includes a housing 32 defining an valve chamber 34, an axially reciprocal spool 36 disposed within the valve chamber 34, a feedback spring 38 operatively interconnecting the spool 36 with the torque motor 22, and a receiver 40 having two spaced apart fluid receiving ports 42 and 44 therein. A pair of conduits 46 and 48 extend through the housing 32 with conduit 46 connecting the right end of the valve chamber 34 to the right receiving port 42 and the conduit 48 connecting the left end of the valve chamber 34 to the left receiving port 44. The torque motor 22 includes a feedpipe nozzle 24 and is mounted to the primary EHV 30 such that the outlet of the feedpipe nozzle 24 is disposed opposite the receiver 40 intermediate the ports 42 and 44. The torque motor 22 is controlled by the electronic controller 20 in conventional manner well known in the art to selectively port pressurized fluid from a supply conduit 26 through the feedpipe nozzle to the receiving ports 42 and 44 and conduits 46 and 48, respectively, so as to differentially pressurize the opposite end faces and thereby selectively axially position the spool 36 within the axially elongated valve chamber.

The spool 36 has a right end land 52, a left end land 56 and a central land 54 in spaced relationship therebetween so as to form a first flow cavity 23 between the left end land 56 and the central land 54 and a second flow cavity 25 between the right end land 52 and the central land 54. Five axially spaced ports 31, 33, 35, 37 and 39 open to the valve chamber 34. The central port 35 is connected in fluid communication through the valve housing 32 to a drain conduit 55, the two outside ports 31 and 39 are inlet ports connected in fluid communication through the valve housing 32 to a supply conduit 51 through which pitch change fluid flows at supply pressure from either the main pump 110 or the auxiliary pump 112, and the remaining two ports 33 and 37 are outlet ports with the outlet port 33 being connected in fluid communication through the valve housing 32 to the coarse pitch conduit 53 through which pitch change fluid flows to conduit 153 of the torque tube 150 to the coarse pitch chamber 132 of the actuator 130 and outlet port 37 being connected in fluid communication through the valve housing 32 to the fine pitch conduit 57 through which pitch change fluid flows to conduit 157 of the torque tube 150 to the fine pitch chamber 134 of the actuator 130. By selectively positioning the spool 36 within the valve chamber 34, the lands 52, 54 and 56, and the flow cavities 23 and 25 therebetween, may be positioned to close or open the outlet ports 33 and 37, as desired, to the supply conduit 51 through ports 31 or 39, or to the drain conduit 55 through port 35.

The land 52 of spool 36 is sized relative to the inlet port 39 from the supply conduit 51 such that when the outlet port 37 to the fine pitch conduit 57 is open to the flow cavity 25, a flow window 47 is provided between the flow cavity 25 and the port 39 of sufficient dimension to ensure that supply pressure fluid is ported through the fine pitch conduit 57 to the fine pitch chamber of the pitch change actuator throughout normal operation. Additionally, the lands 56 and 54 are sized relative to the inlet port 31 from the supply conduit 51 and the drain port 35, respectively, to provide windows 41 and 45 such that the pressure ported through the outlet port 33 to the coarse pitch conduit 53 varies between the relatively low drain pressure, Pd, at window 45 and the relatively high supply pressure, Ps, at window 41 depending upon the position of the spool 36. At any position of the spool 36 whereat both windows 41 and 45 are open, the flow of fluid into the cavity 23 between lands 56 and 54 from the supply conduit 51 through window 41 and the flow of fluid out of the cavity 23 through window 45 into the drain conduit 55 must be equal. When the windows 41 and 45 are open such that they are of equal flow area, i.e. the spool is in its neutral position, the pressure within the cavity 23 and ported to the coarse pitch change conduit 53 will be equal to $\frac{1}{2}$(Ps-Pd). As the position of the spool 36 is modulated by the electronic controller 20 through the torque motor 22 about this neutral position, the flow areas of the windows 41 and 45 will change. As the spool 36 is moved to the right, the area of window 45 increases and the area of window 41 decreases, thus reducing the pressure within the cavity 23 and the coarse pitch change conduit 53 until it reaches drain pressure, Pd, when the window 41 becomes fully closed. Conversely, as the spool 36 is moved to the left, the area of window 45 decreases and the area of window 41 increases, thus increasing the pressure within the cavity 23 and the coarse pitch change conduit 53 until it reaches supply pressure, Ps, when the window 45 is fully closed.

The protection EHV 60 comprises a hydraulically actuated spool valve having a housing 70 defining an axially elongated valve chamber 72 therein and an axially reciprocal spool 80 disposed within the valve chamber 72. The reciprocal spool 80 has a first end face 82 at one end thereof and a second end face 84 at the axially opposite end thereof, one of which has a smaller face area, in the depicted embodiment the left end face 82, than the other. In accordance with the present invention, the smaller area end face 82 of the spool 80 is continuously exposed to supply pressure fluid from the supply conduit 51, and the larger area end face 84 of the spool 80 is exposed either to a regulated pressure fluid passed to the right end of the valve chamber 72 through conduit 161 from an emergency overspeed governor 160 which has authority only in the event of failure of the electronic controller 20 or to supply pressure fluid from conduit 151 in the event that the protection solenoid 50 opens to allow supply pressure fluid to flow to the right end of the valve chamber 72 to either effect emergency feathering of the blades or in response to a low pitch warning.

The spool 80 has a left end land 86, a right end land 88 and a central land 87 in spaced relationship therebetween so as to form a first flow cavity 63 between the left end land 86 and the central land 87 and a second flow cavity 65 between the right end land 88 and the central land 87. Seven axially spaced ports 69, 71, 73, 75, 77, 79 and 81 open through the valve housing 70 to the valve chamber 72. The central port 75 is connected in fluid communication to drain, the outside left end port 69 is connected in fluid communication to the supply conduit 51 through which pitch change fluid flows at supply pressure from either the main pump 110 or the auxiliary pump 112, and the outside right end port 81 is connected in fluid communication to drain. The two intermediate ports 71 and 73 are connected in fluid communication with the upstream side and downstream side, respectively, of the coarse pitch conduit 53, and the two intermediate ports 77 and 79 are connected in fluid communication with the upstream side and downstream side, respectively, of the fine pitch conduit 57.

The spool 80 also has a passage 78 opening to the valve chamber 72 through the larger end face 84 and axially extending therefrom to a port 85 in the land 88 which is positionable to open to an annular cavity 67 in the housing 70, the annular cavity 67 being connected to drain. When the spool 80 is stroked to its far right position, the passage 78 is closed, i.e. not open to drain through cavity 67. When the pressure force exerted on the larger right end face 84 of the spool 80 by the regulated pressure fluid ported from the overspeed governor 160 exceeds the pressure force applied by supply pressure fluid on the smaller left end face 82, the spool 80 is translated to the left away from its far right position and the passage 78 increasingly opens to drain as port 85 progressively opens to drain port 83 which in turn connects to the cavity 67 which is connected to the drain conduit 55, such that the spool 80 ceases stroking to the left when the pressure forces acting on the opposite end faces thereof are again balanced. Therefore, the position of the spool 80 within the valve chamber 72 relative to the right end thereof is proportional to the amount of overspeed.

During normal operation, i.e. when the electronic controller 20 is in authority and controlling blade pitch through the primary EHV 30, the spool 80 of the protection valve 60 is stroked to the far right of the valve chamber 72 by the higher supply pressure applied to the smaller end face 82 of the spool 80 by fluid passing from the upstream side of supply conduit 51 through passage 93 to the downstream side of the supply conduit 51, as depicted in FIG. 2. With the spool 80 so positioned, the land 86 closes supply fluid port 69, the land 87 closes drain port 75, flow cavity 63 connects in fluid communication the two intermediate ports 71 and 73 thus allowing coarse pitch change fluid from the primary EHV 30 to pass from the upstream side of the coarse pitch change conduit 53 through the cavity 63 to the downstream side of the coarse pitch change conduit 53 and thence through the conduit 153 of the transfer tube 150 to the coarse pitch chamber 132 of the actuator 130, and flow cavity 65 connects in fluid communication the two intermediate ports 77 and 79 thus allowing fine pitch change fluid from the primary EHV 30 to pass from the upstream side of the fine pitch change conduit 57 through the cavity 65 to the downstream side of the fine pitch change conduit 57 and thence through the conduit 157 of the transfer tube 150 to the fine pitch chamber 134 of the actuator 130. Thus, during normal operation, the protection valve 60 does not at all interfere with the operation of the primary EHV 30 or the authority of the electronic controller 20.

Operatively associated with the protection valve 60 is the protection solenoid 50 which when energized transfers authority over blade pitch from the primary EHV 30 to the protection valve 60. In the event that it is necessary to feather the blades, the electronic controller 20 or the pilot energizes the protection solenoid 50 thereby retracting the closure ball 52 and opening port 54 to port supply fluid at supply pressure from the supply conduit 151 against the larger end face 84 of the spool 80, thus creating a pressure force on the spool 80 which counters and overcomes the pressure force exerted by supply fluid on the smaller area end face 82 thereby fully stroking the spool 80 to the left. With the spool 80 so positioned, the land 87 closes the coarse pitch fluid inlet port 73 and the land 88 closes the fine pitch fluid inlet port 79, thereby blocking the authority of the primary EHV 30 over pitch control. Additionally, the cavity 63 connects in fluid communication the coarse pitch fluid outlet port 71 with the supply port 69 thereby porting pitch change fluid from the supply conduit 51 at supply pressure directly to the coarse pitch fluid conduit 53 thence through conduit 153 of the torque tube 150 to the coarse pitch chamber 132, while the cavity 65 connects in fluid communication the fine pitch fluid outlet port 77 with the drain port 75 thereby permitting fine pitch change fluid to drain from the fine pitch chamber 134 back through conduit 157 of the torque tube 150 and thence the fine change fluid conduit 57 into the cavity 65 and therefrom to drain through port 75. In this manner, rapid movement of the blades to feather is ensured.

The protection solenoid 50 is also energized by the electronic controller 20 in response to the receipt by the electronic controller 20 of a warning signal from a low pitch stop sensor 170 operative to provide such a warning signal whenever the pitch change actuator has moved beyond a preselected limit in the fine pitch direction. As the particular type of the low pitch stop sensor 170 utilized is not germane to the present invention, the low pitch stop sensor 170 may comprise any of a number of known low pitch stop sensors conventionally used on propeller pitch control systems. As depicted herein, the low pitch stop sensor 170 senses the movement of the torque tube 150 which is mounted to the pitch change actuator 130 to translate therewith and when the torque tube has moved forwardly beyond a preselected point, the sensor 170 sends a pressure signal to the switch 172 which transmits a warning signal proportional to that pressure signal to the electronic controller 20.

In response to the warning signal indicating that the torque tube 150 has moved beyond that preselected low pitch limit point, the electronic controller 20, unless instructed to ignore that warning signal such as during ground operation when it may be desired to move the blades past the low pitch limit, selectively energizes the protection solenoid 50 to partially retract the closure ball 52 thereby partially opening port 54 to pass pitch change fluid at a desired pressure somewhat below supply pressure, due to the pressure drop through the restricted flow area of the partially open port 54. As a result of the application of fluid at the desired pressure against the right end face 84 of the spool 80, the spool 80 is partially, but not fully translated to the left, thereby partially opening the drain port 75 to cavity 65 and partially opening the supply port 69 to cavity 63 causing a controlled amount of supply pressure fluid to be ported to the coarse pitch conduit 53 thereby increasing the pressure of the coarse pitch change fluid in the coarse pitch chamber 132 and draining a controlled amount of fine pitch fluid from the fine pitch change fluid conduit 57 thereby decreasing the pressure of the fine change pitch fluid in the fine pitch chamber 134. The spool 80 will stroke leftward until the flow of fluid from the passage 78 through the window opened between the port 85 and the port 83 equals the fluid flow to the protection valve 60 from conduit 171. By controlling the position of the spool 80 within the valve chamber 72 by modulating the fluid flow from conduit 161 through port 54 by means of the protection solenoid 50, the magnitude of the coarse pitch pressure and the fine pitch pressure may be appropriately adjusted to stop further progression of the blades 120 toward finer pitch, avoid undesired passage beyond the low pitch stop limit, and maintain the pitch of the blades within the pitch setting range corresponding to the permitted low pitch limits, despite failure of the electronic controller 20.

In addition to low pitch stop protection, the pitch change control system of the present invention provides for pitchlock and decrease pitch rate limiting. During normal operation, the primary EHV 30 maintains the fluid ported through the fine pitch change conduit 57 at supply pressure and modulates the pressure of the fluid ported through the coarse pitch conduit 53. However, in the event that the primary EHV 30 is unable to maintain sufficient coarse pitch fluid pressure, for example as in the event of pump deterioration, the electronic controller 20 will stroke the spool 36 to open port 37 to the drain port 55 via cavity 25 so that the fine pitch conduit 57 is exposed to drain pressure and fine pitch change fluid will drain from the fine pitch fluid chamber 134 to drain, thereby causing the pressure in the fine pitch fluid chamber 134 to deteriorate. As a result, the fine pitch pressure, Pf, becomes equal to drain pressure, Pd, and the force applied to the face of the fine pitch piston 144 decreases substantially, whereby there is insufficient pressure force applied to the fine pitch piston 144 to move the fine pitch piston forwardly, even through the coarse pitch pressure has deteriorated. As the fine pitch piston 144 does not translate, the ballscrew 148 on which it is mounted does not rotate, and the pitchlock screw 146 to which the coarse pitch piston 142 is threaded is thereby prevented from rotating, thus preventing translation of the coarse pitch piston 142 despite the excessive blade loading forces thereon. This immobility results in pitchlock of the piston actuator whereby the blade pitch is maintained at its desired setting, i.e. effectively pitchlocking the blades in place despite the deterioration of coarse pitch pressure.

Decrease pitch rate limiting may be provided by a pitch rate limiter 180 operatively disposed in the drain conduit 55 downstream of the primary EHV 30. The rate limiter 180 includes a spring biased throttling piston 182 having a forward end face 184 and a cylindrical sleeve portion 186 extending rearwardly therefrom having an outlet port 185 therein. A central orifice 183 is provided in the forward end face of the throttling piston 182 and is open at its upstream end to the drain conduit 55 opening to the drain port 35 of the primary EHV 30 and is open at its downstream end to drain. During a decrease pitch change, i.e. a change toward finer blade pitch, coarse pitch change fluid drains from the coarse pitch fluid chamber 132 through conduits 153 and 53, thence through cavity 23 of the primary EHV 30 through drain port 35 into conduit 55. The pressure drop experienced across the orifice 183 as the draining coarse pitch fluid passes through the rate limiter 180 results in a proportional rearward axial translation of the throttling piston 182 thereby reducing the area of the flow window between the outlet port 185 and drain, thus limiting the rate at which coarse pitch fluid may drain through the limiter 180 and, consequently, the rate at which the actuator 140 may translate forwardly to move the blades to a finer pitch setting. The rate limiter 180 functions only to limit the decrease pitch rate and does not limit the rate at which the blades may be feathered. To permit rapid feathering, a check valve 190 disposed between the fine pitch conduit 57 and the supply conduit 51 opens to allow fine pitch fluid to drain from the fine pitch fluid chamber 134 into the supply conduit 51 and thereby bypass the protection valve 60, the primary EHV 30 and the rate limiter 180.

Emergency overspeed protection is also provided in the event of failure of the electronic controller 20, such as would occur in the event of complete electrical failure, by modulating the protection valve 60 through the regulated pressure signal produced by the emergency overspeed governor 160 and applied to the right end face 84 of the spool 80. Although depicted as a conventional mechanical overspeed governor of the type well known in the art and commonly employed in pitch change control systems, the emergency overspeed governor 160 may alternatively be an electrohydraulic overspeed governor of conventional type known in the art. The mechanical overspeed governor 160 operates in a manner well known to those skilled in the art to port pitch change fluid from supply conduit 251 at a regulated pressure through conduit 171 to the right end face 84 of the spool 80, the magnitude of the regulated pressure, Pr, as a fraction of the supply pressure, Ps, being determined by the position of the central governor land relative to the inlet port to conduit 161. The overspeed governor 160, which is designed in a manner well known to those skilled in art, functions to modulate the regulated pressure relative to the supply pressure and, in conjunction with the protection valve 60, to position the blades to maintain engine speed within preselected limits, for example from 100% to 107% of normal rpm, during emergency overspeed conditions when the electronic controller 20 has failed to avoid an overspeed condition. The spool 80 of the protection valve 60 translates to the left whenever the pressure force generated by the regulated pressure applied to the larger end face 84 of the spool 80 exceeds the pressure force generated by the supply pressure applied to the smaller end face 82 of the spool 80. Again, as the spool 80 moves leftward, the cavity 63 becomes partially open to the supply port 69 whereby supply pressure fluid is ported into the cavity 63 to increase the fluid pressure in the coarse pitch change conduit 53 and the cavity 65 becomes partially open to the drain port 75 whereby the fine pitch change fluid drains from the cavity 65 to reduce the fluid pressure in the fine pitch change conduit 57. The spool 80 will stroke leftward until the flow of fluid from the passage 78 through the window opened between the port 85 and the port 83 equals the fluid flow to the protection valve 60 from the overspeed governor 160. Thus, the overspeed governor 160 generates a regulated pressure fluid signal proportional to the propeller overspeed which is transmitted through conduit 161 to the right end of the spool 80 to modulate the position of the spool 80 within the valve chamber 72, thereby adjusting the magnitude of the coarse pitch pressure and the fine pitch pressure, whereby the pitch of the blades may be held within the pitch setting range corresponding to the permitted engine limits during emergency overspeed operation despite a failure of the electronic controller 20.

The overspeed governor 160 may be disarmed during ground operation so that the electronic controller 20 may move the blades to reverse pitch through flat pitch as desired by energizing the lockout solenoid 164 to close off the flow of supply pressure fluid to the overspeed governor through conduit 251. The reset solenoid 162, which is energized during normal operation, may be released, that is unenergized, during ground operation to permit testing of the governor.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A pitch change control system for use in a pitch change actuation system for adjusting the pitch of a blade of a variable pitch propeller, the blade rotatively mounted to a hub of the propeller, said pitch change actuation system having a pitch change actuator piston operatively connected to the blade and said pitch change control system operatively connected to the pitch change actuator piston for selectively pressuring the pitch change actuator piston to effectuate a desired change in the pitch of the blade, said pitch change control system comprising:

a. a primary electrohydraulic valve operative during normal operation to receive a pitch change fluid at a supply pressure and to pass a first portion of the pitch change fluid therefrom through a first conduit as a coarse pitch fluid at a modulated pressure less than the supply pressure and to pass a second portion of the pitch change fluid therefrom through a second conduit as a fine pitch fluid at the supply pressure, said primary electrohydraulic valve having a valve chamber and a spool selectively positionable within the valve chamber, the modulated pressure at which the coarse pitch fluid is passed through said first conduit to the pitch change actuator being a function of the position of the spool within the valve chamber;

b. an electronic control means operatively associated with said electrohydraulic valve for selectively positioning the spool thereof within the valve chamber thereof to provide blade pitch control, overspeed protection, low pitch stop limit protection and feathering during normal operation;

c. a protection valve disposed between said primary electrohydraulic valve and the pitch change actuator and having a valve chamber communicating with said first and second conduits and a spool selectively positionable within the valve chamber, said protection valve operative to pass the coarse pitch fluid at a first pressure and the fine pitch fluid at a second pressure to the pitch change actuator piston, the first pressure at which the coarse pitch fluid is passed and the second at which the fine pitch fluid is passed to the pitch change actuator being a function of the position of the protection valve spool within the valve protection chamber; and d. a protection solenoid operatively associated with said electronic control means and said protection valve, said protection solenoid operative in the event of a failure of said electronic control means to selectively position the spool of said protection valve away from a first position at which said protection valve passes the coarse pitch fluid at the modulated pressure and the fine pitch fluid at the supply pressure as received from said primary electrohydraulic valve whereby authority for supply of the coarse and the fine pitch change fluid to the pitch change actuator piston is transferred from said primary electrohydraulic valve to said protection valve.

2. A pitch change control system as recited in claim 1 wherein said protection valve is selectively operative to provide overspeed protection, low pitch stop limit protection and emergency feathering in the event of a failure of said electronic control means.

3. A pitch change control system as recited in claim 1 wherein the spool of said protection valve is selectively positionable to block the passage of coarse pitch fluid and fine pitch fluid from said primary electrohydraulic valve and pass coarse pitch fluid at supply pressure to the pitch change actuator piston and to pass fine pitch fluid from the pitch change actuator piston to drain to provide emergency feathering.

4. A pitch change control system as recited in claim 1 wherein the spool of said protection valve is selectively positionable to pass coarse pitch fluid at a third pressure between the modulated pressure and the supply pressure and to pass fine pitch fluid at a fourth pressure less than the supply pressure to the pitch change actuator to provide emergency overspeed protection.

5. A pitch change control system as recited in claim 1 wherein the spool of said protection valve is selectively positionable to pass coarse pitch fluid at a third pressure between the modulated pressure and the supply pressure and to pass fine pitch fluid at a fourth pressure less than the supply pressure to the pitch change actuator to provide low pitch stop limit protection.

* * * * *